United States Patent [19]

Artz et al.

[11] Patent Number: 4,468,263

[45] Date of Patent: Aug. 28, 1984

[54] SOLID PROPELLANT HYDROGEN GENERATOR

[75] Inventors: Glen D. Artz, Canoga Park; Louis R. Grant, Los Angeles, both of Calif.

[73] Assignee: The United States of America as represented by the Secretary of the Army, Washington, D.C.

[21] Appl. No.: 450,849

[22] Filed: Dec. 20, 1982

[51] Int. Cl.$^3$ .............................................. C06B 43/00
[52] U.S. Cl. ...................................... 149/22; 149/36; 149/46
[58] Field of Search ............................. 149/22, 36, 46

[56] References Cited

U.S. PATENT DOCUMENTS

| | | | |
|---|---|---|---|
| 3,170,283 | 2/1965 | Sayles | 149/22 |
| 3,666,672 | 5/1972 | Hiltz | 252/188 |
| 3,948,699 | 4/1976 | Ayers et al. | 149/22 |
| 3,948,700 | 4/1976 | Ayers et al. | 149/109.2 |
| 4,021,362 | 5/1977 | Channell et al. | 252/188 |
| 4,061,512 | 6/1977 | Chew et al. | 149/22 |
| 4,064,225 | 12/1977 | Chew et al. | 423/648 R |
| 4,108,697 | 8/1978 | Goddard | 149/22 |
| 4,157,927 | 6/1979 | Chew et al. | 149/22 |
| 4,166,843 | 9/1979 | Flannagan | 423/648 R |
| 4,234,363 | 11/1980 | Flanagan | 149/19.9 |
| 4,315,786 | 2/1982 | English | 149/22 |
| 4,341,651 | 7/1982 | Beckert et al. | 149/87 |
| 4,381,206 | 4/1983 | Grant et al. | 149/22 |

*Primary Examiner*—Edward A. Miller
*Attorney, Agent, or Firm*—Anthony T. Lane; Robert P. Gibson; Jack W. Voigt

[57] ABSTRACT

Solid reactant hydrogen gas generator formulations which yield greater than 15 weight percent hydrogen of greater than 98 mole percent hydrogen purity are formulated of a primary heat and hydrogen source selected from ammonia borane from about 50 to about 70 weight percent and hydrazine bisborane from about 0–30.00 weight percent, a first hydrogen-containing compound that functions as an auxiliary heat and hydrogen source consisting of ammonium nitrate from about 10.20 to about 17.82 weight percent, and a second hydrogen-containing compound that functions as an auxiliary heat and hydrogen source consisting of $(NH_4)_2B_{10}H_{10}$ from about 9.80 to about 17.18 weight percent.

5 Claims, 4 Drawing Figures

PRESSURE – TIME CURVE

TEMPERATURE – TIME CURVE

SOLID PROPELLANT HYDROGEN GENERATOR

DEDICATORY CLAUSE

The invention described herein was made in the course of or under a contract or subcontract thereunder with the Government; therefore, the invention described herein may be manufactured, used, and licensed by or for the Government for governmental purposes without the payment to us of any royalties thereon.

BACKGROUND OF THE INVENTION

The development of hydrogen and/or deuterium generation sources for fuels for lasers has obviated the need for high pressure storage facilities under cryogenic conditions.

After the development of hydrogen and/or deuterium generation sources for high purity laser fuels the needs were recognized for additional improvements such as chemical reactants capable of generating hydrogen or deuterium in higher yield and with higher purity as evidenced by the evolution of the art described below.

A comprising a cured intimate mixture of about 85% to 95% by weight hydrazine bisborane and about 5% to 15% by weight of an organic polymeric binder is disclosed in U.S. Pat. No. 3,170,283 by David C. Sayles. This composition decomposes to yield decomposition products of hydrazine bisborane consisting of $H_2$ and $B_3N_3$.

Compositions which generate hydrogen are disclosed in U.S. Pat. No. 3,666,672, "Hydrogen Generating Compositions", by Ralph H. Hiltz. Disclosed is an autogeneously combustible composition that liberates hydrogen on burning. The composition contains an alkali metal borohydride and hydrazine sulfate in proportions such that there are between about 0.5 to 2 boron atoms for each nitrogen atom.

Examples of prior art compositions for producing hydrogen or deuterium at about 600° C.-700° C. are disclosed by Ayers et al in U.S. Pat. No. 3,948,699. These compositions are based on complex metal boron compounds of the general formula $M(BH_4)_x$ or $M(BD_4)_x$ (wherein M equals a metal and x equals the valence of the metal M; M is an alkali metal or an alkali earth metal; H is hydrogen, and D is deuterium) and metal oxides of the general formula $Q_2O_3$ (wherein Q is a trivalent metal selected from iron, aluminum, gallium, cobalt, and indium) combined stoichiometrically.

Higher temperature hydrogen or deuterium (e.g., about 3000° C.) production is disclosed by Ayers et al in U.S. Pat. No. 3,948,700. This patent discloses a storable solid propellant composition based on unsolvated aluminum deuteride or unsolvated aluminum hydride and ferric oxide which produces high temperature gases from a self-sustaining reaction, once started, by a heat source such as an electrically heated nickel-chromium ignition wire. The hydrogen or deuterium produced is acceptable for use in HF/DF and HCl chemical lasers, the gas dynamic laser (GDL), or a source of hot gases for reducing fuel.

Channell et al discloses in U.S. Pat. No. 4,021,362 a gas generating system for chemical lasers which comprises a solid composition comprised of about 60 to 70 percent by weight of lithium aluminum deuteride, about 20 to 30 percent of deuteroammonium chloride, about 5 to 15 percent by weight iron oxide, and about 3 to 4 percent by weight of a hydrocarbon polymeric binder.

Additional prior art is disclosed by Chew et al in U.S. Pat. Nos. 4,061,512 and 4,064,225 which relate to storable solid propellent compositions and method of producing hydrogen or deuterium from these complex metal boron compounds of the general formula $M(BH_4)_x$ or $M(BD_4)_x$ (wherein M equals a metal and x equals the valence of the metal M; M is an alkali metal or an alkaline earth metal; H is hydrogen, and D is deuterium) and ammonium salts of the general formula $(NH_4)_nY$ or deuteroammonium salts of the general formula $(ND_4)_nY$ (wherein Y represents an anion with a total charge of n; N is nitrogen, H is hydrogen, and D is deuterium). The specified compounds combined stoichiometrically or in varying molar ratios produce hydrogen or deuterium that contains nitrogen as an inert diluent which is acceptable for use in HF/DF chemical lasers, the gas dynamic laser GDL, or as a source of hydrogen containing an inert duluent.

In recent disclosures by Chew et al in U.S. Pat. No. 4,157,927, a class of compounds known as amineboranes and their derivatives are mixed with heat producing compounds such as lithium aluminum hydride or a mixture, such as $NaBH_4/Fe_2O_3$ mixtures combined in definite proportions in a mixer or ball mill to produce a uniformly mixed powder. The mixed powder is then pressed into pellets and ignited to produce the hydrogen or deuterium as well as by products that are non-deactivating diluents. The oxide/borohydride or oxide/aluminohydride combination provides the thermal energy for decomposition of the amine borane.

Joseph E. Flannagan discloses in U.S. Pat. No. 4,166,843 a solid propellant gas generator system employing borane compounds of the formula $(CH_3)_xH_{4-x}NB_3H_8$ as the primary source and a metallic complexing agent to trap the carbon molecules as solid metallic carbides.

The review of extensive prior art from 1965 through 1979 has revealed several approaches which have been investigated as possible means of developing storable sources of $H_2$ and $D_2$. The systems that have been studied are primarily based on complex borohydrides, or aluminohydrides, and ammonium salts. These systems have an upper theoretical weight yield ($H_2$) limit of approximately 8.5%. Recent systems studies have indicated that an improvement in the $H_2$ weight yield is desirable and the systems under discussion provide the desired theoretical performance.

The required improvements in $H_2(D_2)$ weight yield will not result from solid reactants based upon the interaction of metal borohydrides, or aluminohydrides, and ammonium salts, or from catalytic decomposition of the active hydride compounds. This pessimistic viewpoint is based on the fact that for the $NaBH_4/NH_4^+$ salt systems, for example, the generation of hydrogen is the result of the reaction of the $NH_4^+$ cation and the $BH_4^-$ anion. Therefore, the counter ions only serve to stabilize these reactive ions and, consequently, result in a lower gas weight yield because of their additional weight.

Because of this drawback of current solid reactants for $H_2(D_2)$ generation, the approach to be used for achieving higher weight yields is to consider those compounds that have, on a molecular basis, only those chemical groups that react to form $H_2(D_2)$. Such compounds exist and should provide the desired improvements in gas yield provided the proper combination is discovered.

Representative of the classes of compounds considered for this application and which contain only B, N, and H (both positive and negative) are:
1. Amine boranes (AB);
2. Boron hydride ammoniates (DDA);
3. Borazanes (HBB); and,
4. Ammonium octahydrotriborates or tetrahydroborates Compounds within the first three general classes, although both positive and negative hydrogens are present, are thermally stable and vary in their hydrolytic stability. while quarternary alkyl ammonium octahydrotriborates and tetrahydroborates are thermally stable, the unsubstituted ammonium salts readily decompose at or below ambient temperature.

The only hydrogen generator compound, of the three primary candidates presented under 1, 2 and 3 above which has self sustaining combustion characteristics is HBB. Unfortunately, this compound tends to go through a deflagration to detonation transition (DDT) rather easily. Combinations of HBB and AB-1, wherein the HBB concentration is greater than 30 weight percent, also tend toward DDT. Insufficient heat generation from the hydrogen generator formulation results in poor ignition and incomplete decomposition of the primary hydrogen containing molecule. The rationale for this thermal decomposition process is presented in the following equations.

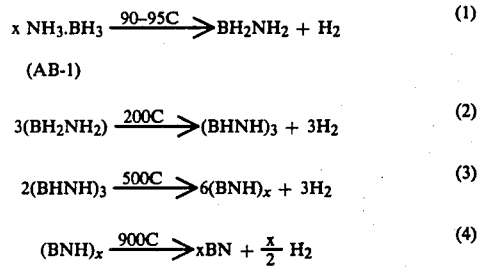

Decomposition of AB-1 is a step-wise reaction as shown in equations (1) through (4) and is quite slow and incomplete unless sustained high temperatures are available.

Therefore, a primary object of this invention is to provide a primary source in the form of hydrogen or deuterium generator molecule in combination with other heat sources to aid in decomposition of the primary source for hydrogen or deuterium generation.

Another object of this invention is to provide a gas generator composition which produces a high yield of greater than 15 weight percent hydrogen having a purity greater than 98 mole percent of hydrogen.

A further object of this invention is to provide a gas generator composition which decomposes efficiently without going through a deflagration to detonation transition (DDT).

SUMMARY OF THE INVENTION

A solid reactant hydrogen gas generator composition of this invention is comprised of ammonia borane (AB-1) in an amount from about 65.00 weight percent to about 70.00 weight percent as a primary hydrogen containing molecule, a first hydrogen-containing material, ammonium nitrate (AN), in an amount from about 15.27 weight percent to about 17.82 weight percent as an auxiliary heat source, and a second hydrogen containing material, $(NH_4)_2B_{10}H_{10}$ (HV465), in an amount from about 14.73 weight percent to about 17.18 weight percent as an additional auxiliary heat source. Alternately, a combination of 50 weight percent AB-1 and 30 weight percent of hydrazine bisborane (HBB) can be employed as the primary heat and hydrogen source in combination with about 10.2 weight percent of AN and about 9.8 weight percent HV465 as the auxiliary heat source to achieve a high hydrogen yield of about 16.52 weight percent. The auxiliary heat sources aid in decomposition of AB-1 and HBB to yield a high purity gas which exceed 98 mole percent hydrogen and a yield of hydrogen exceeding 15 weight percent. Pellets, about 1-inch in diameter by about 1.2 inches long, were pressed from several variations in the above formulation and tested in a gas generator fixture provided with an igniter means, a combustion zone grain retainer, and terminating with a gas accumulator and a gas sampler. A plurality of pressure and temperature measuring means accurately measured the temperature and pressure values extending from the combustion zone grain retainer having a perforated plate through which the combustion gases were discharged through a packed screen filter, a 20 micrometer multiporous stainless steel filter, and a 5 micrometer multiporous stainless steel filter to the gas accumulator and gas sampler.

DESCRIPTION OF THE PREFERRED EMBODIMENT

Figure 1:
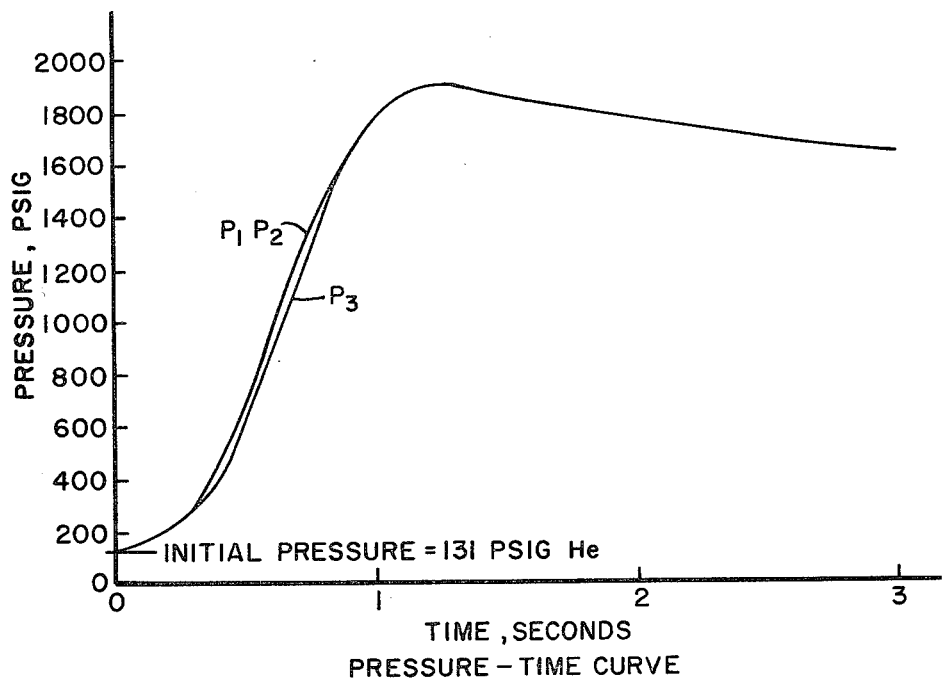
FIGS. 1 and 2 of the drawings are typical pressure-time and temperature-time combustion curves for the gas generator composition comprised of AB-1, HV465, and AN.

A solid reactant hydrogen gas generator formulation based on the combination of a theoretically high yielding, hydrogen-containing compound (primary $H_2$ source) with hydrogen-containing materials (auxiliary heat sources) which upon ignition decomposes exothermically has routinely yielded higher than 15 weight percent hydrogen of greater than 98 mole percent purity.

Table I below, "Reactants For $H_2$ Gas Generators", sets forth properties of reactants evaluated for arriving at the preferred solid reactant hydrogen gas generator of this invention.

The only hydrogen generator compound, of the three primary candidates presented in Table I, which has self sustaining combustion characteristics is HBB. Unfortunately this compound tends to go through a deflagration to detonation transistion (DDT) rather easily. Combinations of HBB and AB-1, wherein the HBB concentration is greater than 30 weight percent, also tend toward DDT. Therefore, because DDA was found to be chemically incompatible with all the primary heat source tried, the preferred hydrogen generator composition is AB-1, HV465, and AN set forth in Table II. Alternately, a combination of HBB of about 30 weight percent with AB-1 of 50 weight percent along with AN of about 10.2 weight percent and HV465 of about 9.8 weight percent yielded a high percent hydrogen of about 16.52 weight percent. The combination of AB-1 plus HBB as the primary heat and hydrogen source are set forth in Table III along with HV465 and AN as the auxiliary heat and hydrogen source.

TABLE I

REACTANTS FOR $H_2$ GAS GENERATORS

| COMPOUND | CHEMICAL FORMULA | CODE | $\Delta H_f$ kcal/mole | $T_F$, K | $H_2$, w/% | SOLID PRODUCTS |
|---|---|---|---|---|---|---|
| PRIMARY $H_2$ SOURCE | | | | | | |
| AMMONIA BORANE | $NH_3 \cdot BH_3$ | AB-1 | −38 | 1038 | 19.59 | BN |
| DIBORANE DIAMMONIATE | $BH_2(NH_3)_2BH_4$ | DDA | −83.3 | 925 | 19.59 | BN |
| HYDRAZINE BIS-BORANE | $N_2H_4 \cdot 2BH_3$ | HBB | −30 | 1963 | 16.87 | BN |
| AUXILIARY HEAT SOURCES | | | | | | |
| AMMONIUM NITRATE | $NH_4NO_3$ | AN | −87.23 | ND** | 5.04 | — |
| DIAMMONIUM DECABORANE | $(NH_4)_2B_{10}H_{10}$ | HV465 | −46.2 | 925 | 11.76 | B, BN |

*This product is commercially available from Teledyne-McCormick-Selph
**Not determined
$T_F$, K = flame temperature °K.

TABLE II

| INGREDIENT | FORMULATION 1, WEIGHT PERCENT | FORMULATION 2, WEIGHT PERCENT |
|---|---|---|
| *AMMONIA BORANE (AB-1) | 65.00 | 70.00 |
| **$(NH_2)_2B_{10}H_{10}$ (HV465) | 17.18 | 14.73 |
| ***AMMONIUM NITRATE (AN) | 17.82 | 15.27 |

*Primary heat and hydrogen source.
**Auxiliary heat and hydrogen source.
***Auxiliary heat and hydrogen source.

Formulations 1 and 2 provide the range of ingredients which yields high percentages of hydrogen gas of high purity; however, an additional improvement was achieved by the combination which employed a blend of about 1 part (12.5 weight percent) of formulation 1 with about 7 parts (87.5 weight percent) of formulation 2. This formulation comprised about 69.37 weight percent AB-1, about 15.59 weight percent AN, and about 15.04 weight percent HV465.

TABLE III

| INGREDIENTS | FORMULATION 3 Weight Percent |
|---|---|
| AB-1 | 50 |
| HBB | 30 |
| HV465 | 9.80 |

TABLE III-continued

| INGREDIENTS | FORMULATION 3 Weight Percent |
|---|---|
| AN | 10.20 |
| $T_f$, °K. | 1669 |
| $H_2$, Wt % | 16.52 |

Formulation 3 of Table III has a $H_2$ theoretical yield of 16.80 weight percent and a delivered $H_2$ weight percent from 12.6–16.52 with a $H_2$ purity greater than 94 mole percent.

Figure 4:
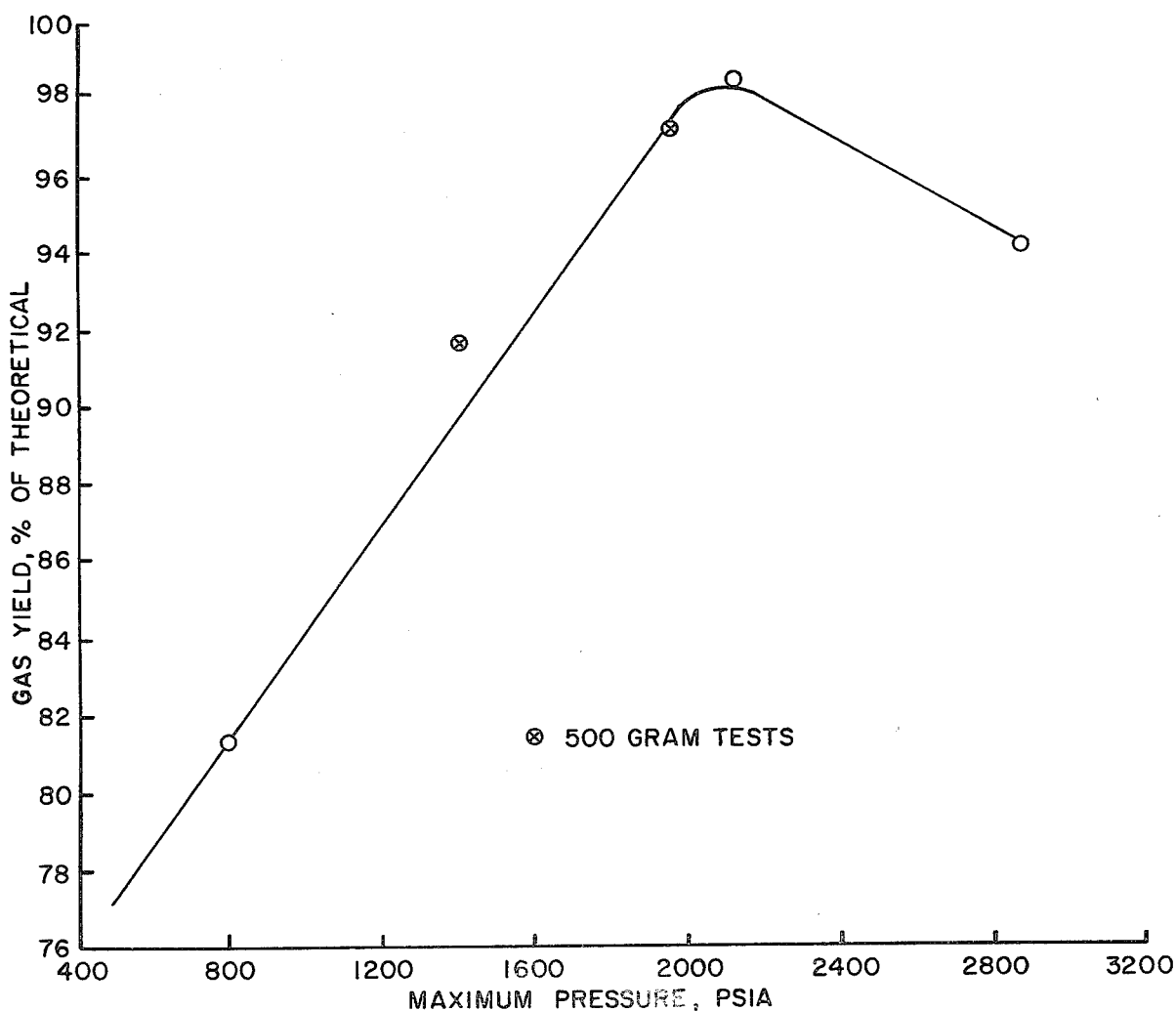

Table IV contains test data to correlate combustion efficiency and maximum combustion pressure. Gas yield % theoretical are depicted in FIG. 4 of the drawing.

TABLE IV

CORRELATION OF COMBUSTION EFFICIENCY AND MAXIMUM COMBUSTION PRESSURE

| GAS YIELD* % THEORETICAL | $H_2$ YIELD WEIGHT PERCENT | $H_2$ YIELD % THEORETICAL | MAXIMUM PRESSURE PSIA | FORMULATIONS** WEIGHT PERCENT 1 | FORMULATIONS** WEIGHT PERCENT 2 |
|---|---|---|---|---|---|
| 98.8 | 15.24 | 94.6 | 1923 | 12.5 | 87.5 |
| 98.6 | 15.31 | 95.0 | 2134 | 12.5 | 87.5 |
| 96.8 | 16.30 | 94.8 | 1929 | 17.4 | 82.6 |
| 95.5 | 16.07 | 93.5 | 1934 | 12.5 | 87.5 |
| 95.3 | 14.70 | 91.5 | 2153 | 26.0 | 75.0 |
| 94.2 | 14.79 | 91.4 | 1706 | — | 100.0 |
| 94.2 | 14.70 | 91.1 | 2888 | 6.2 | 93.8 |
| 91.8 | 14.15 | 86.8 | 2287 | 50.0 | 50.0 |
| 91.5 | 14.51 | 90.0 | 1389 | 13.6 | 87.4 |
| 89.7 | 13.80 | 86.9 | 1151 | 100.0 | — |
| 86.9 | 13.63 | 84.6 | 1177 | 12.5 | 87.5 |
| 81.9 | 12.96 | 79.9 | 876 | 15.0 | 85.0 |
| 81.3*** | 12.50 | 77.6 | 799 | 12.5 | 87.5 |
| 77.8*** | 11.96 | 74.3 | 722 | 12.5 | 87.5 |

*Gas Yield used as a measure of combustion efficiency
**Formulations of Table II
***Coolant/filter pack containing 3240-grams, 0.25-inch Monel balls used Surprisingly, no direct correlation between combustion temperatures and efficiency could be established. Certainly, the AB-1 decomposition process is temperature dependent. One good indication of temperature effect was found in two tests in which a Monel ball coolant pack was used. Combustion efficiency for both these tests was very low, as shown in Table IV. In addition, borazine was found in the gases sampled from the combustion chamber. Borazine is a product in the AB-1 decomposition process and is indicative of incomplete decomposition. The level of borazine in the gases is not significant since borazine is probably a liquid under the conditions present in the chamber at the time of sampling. The pertinent properties of borazine are:
  Formula: $B_3N_3H_6$
  Melting Point, C: −58

A typical gas generator fixture employed in the testing of the solid propellant hydrogen generator comprised a cylindrically shaped device having a burning chamber capable of holding about 2 layers of pellets of 8 to each layer located on one end of the device. A suitable igniter means, appropriate for the system, such as a nichrome resistance wire plus an additional heat source such as 42 parts $TiH_2$ and 58 parts $KClO_4$ for a scaled-up system is employed to ignite the solid propellant. A perforated plate below the pellets provides an outlet for the gas flow to a gas accumulator chamber and a gas sampler via a packed screen filter, a 20 micrometer multiporous stainless steel filter, and a 5 micrometer multiporous stainless steel filter.

The optimum filter design requires numerous considerations since the filtration of the solid particulates (primarily BN) from the $H_2$ gas stream is a difficult task. Considering that the solid combustion products are formed as solids (not going through a liquid phase) and of small particle size (estimated to be less than 50 Microns), filter plugging is a distinct possibility. Filters, staged by pore size as descirbed, with large surface areas are required for adequate filtration.

Figure 2:
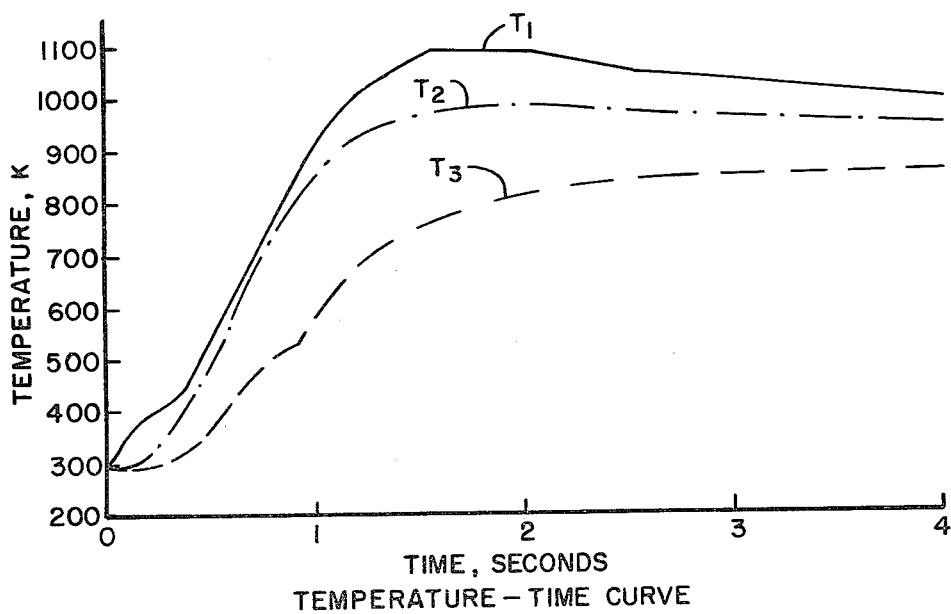

In further reference to the drawings, curves $P_1$, $P_2$ and $P_3$ of FIG. 1 depict on the pressure-time curve pressure readings respectively at the top of combustion chamber ($P_1$), bottom of combustion chamber ($P_2$), and in gas accumulator ($P_3$) for a 17.4/82.6 combination of Formulation 1 and 2 of Table II. By like reference to drawings, curves $T_1$, $T_2$, and $T_3$ of FIG. 2 depict on the temperature-time curve temperature readings respectively at the top of combustion chamber ($T_1$), bottom of combustion chamber ($T_2$), and in gas accumulator ($T_3$) for a like combination of formulations 1 and 2 of Table II.

Figure 3:
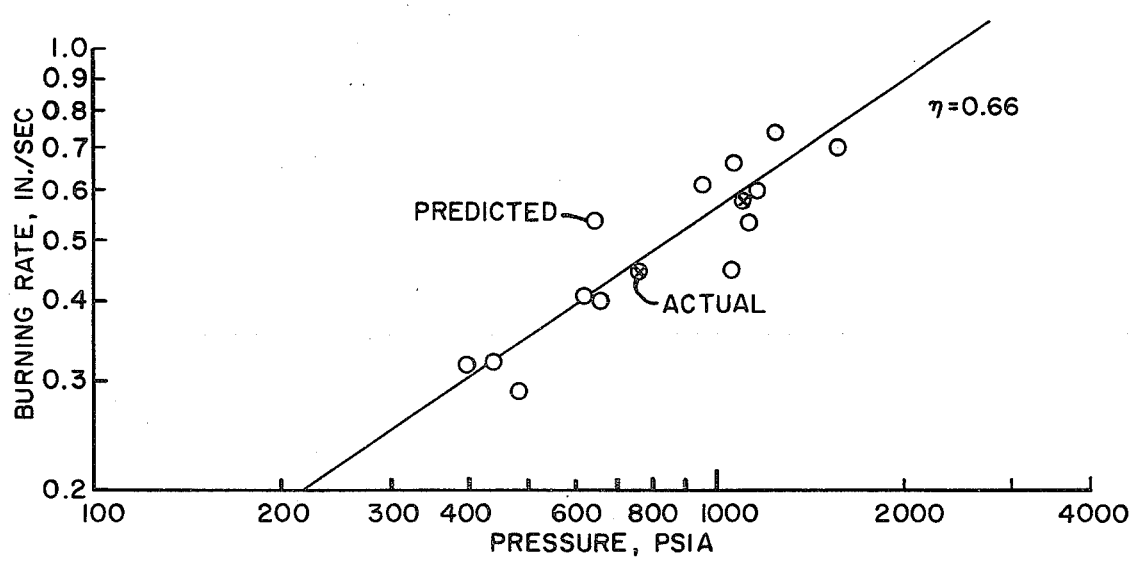
FIGS. 3 and 4 correlate the pellet burning rates with the average chamber pressures and maximum combustion pressures with gas yields for the same formulation to which data of FIGS. 1 and 2 relate.

Correlations of the apparent pellet burning rate with the average chamber pressure and combustion efficiency and maximum combustion pressures with gas yields are presented in FIGS. 3 and 4. Predicted average burning rate as a function of pressure employed the equation $r = aP_c^n$. These curves relate to the preferred composition wherein 12.5 weight percent of Formulation 1 and 87.5 weight percent of Formulation 2 of Table II or a 1/7 ratio of respective Formulations 1 and 2. Other proportions of Formulations 1 and 2 are set forth in Table V. These curves relate to a test which employed 500 grams of propellant, a large-scale gas generator test.

Burning Rate as a Function of Pressure. Prediction of the average burning rate as a function of pressure, using the standard equation, $r = aP_c^n$, has improved considerably, based on the large-scale test data summarized in Table V and FIG. 3. Statistical analyses of the burning rate data in Table V below, using the method of least squares, resulted in the burning rate equation, $r = 0.0066 P_c^{0.64}$. Scatter about the prediction line was significantly reduced and the slope lowered appreciably from >0.80 to 0.66. With a burning rate exponent of 0.66, it would be possible to design a choked-flow gas generator. An internal-external, end burning, monoperforated grain could then be utilized with a near-neutral pressure-time curve and a constant gas flow-rate. This attribute could be very important in designing a vortex separator for removing the solid particulates from the hydrogen gas.

TABLE V

BURNING RATE vs PRESSURE*

| AVERAGE PRESSURE** PSIA | AVERAGE BURNING RATE*** IN/SEC | FORMULATION WEIGHT PERCENT**** | |
|---|---|---|---|
| | | 1 | 2 |
| 400 | 0.32 | 12.5 | 87.5 |
| 446 | 0.32 | 12.5 | 87.5 |
| 488 | 0.29 | 15 | 86 |
| 614 | 0.40 | 100 | — |
| 640 | 0.53 | 100 | — |
| 654 | 0.40 | 12.5 | 87.5 |
| 764 | 0.43 | 12.5 | 87.4 |
| 952 | 0.61 | — | 100 |
| 1064 | 0.45 | 12.5 | 87.5 |
| 1078 | 0.66 | 12.5 | 87.5 |
| 1126 | 0.57 | 17.4 | 82.6 |
| 1136 | 0.53 | 100 | — |
| 1180 | 0.60 | 12.5 | 87.5 |
| 1193 | 0.63 | 25 | 75 |
| 1258 | 0.74 | 50 | 50 |
| 1595 | 0.69 | 6.2 | 93.8 |

*Least Squares Analysis Indicates $r = 0.0066 P_c 0.64$ Correlation Coefficient = 0.885
**Average Pressure = $P_{MAX2} + 10\% P_{MAX}$
***Average Burning Rate = $\frac{0.5 \text{ (1 Pellet Diameter)}}{\text{Burn Duration 10 to 100\% } P_{MAX}}$
****Formulation (TABLE II)

The fully developed $H_2$ generating compositions are prepared from commercially available materials, and there is no technical reason why the deuterated materials cannot be prepared and used in deuterium generating compositions. Therefore, for generating deuterium, the equivalent deuterium compounds would be used in the disclosed composition in place of the disclosed hydrogen containing compounds of applicants' primary heat and hydrogen source and the auxiliary heat and hydrogen sources.

We claim:
1. A solid reactant hydrogen gas generator composition comprising:
   (i) a primary heat and hydrogen source selected from ammonia borane in an amount from about 50.00 weight percent to about 70.00 weight percent and hydrazine bisborane in an amount from 0 to about 30.00 weight percent;
   (ii) a first hydrogen-containing compound that functions as an auxiliary heat and hydrogen source consisting of ammonium nitrate in an amount from about 10.20 weight percent to about 17.82 weight percent; and,
   (iii) a second hydrogen-containing compound that functions as an auxiliary heat and hydrogen source consisting of $(NH_4)_2B_{10}H_{10}$ in an amount from about 9.80 weight percent to about 17.18 weight percent.

2. The composition of claim 1 wherein said primary heat and hydrogen source selected is ammonia borane in an amount of about 65.00 weight percent; said first hydrogen-containing compound of ammonium nitrate is present in an amount of about 17.82 weight percent; and said second hydrogen-containing compound of $(NH_4)_2B_{10}H_{10}$ is present in an amount of about 17.18 weight percent.

3. The composition of claim 1 wherein said primary heat and hydrogen source selected is ammonia borane in an amount of about 70.00 weight percent; said first hydrogen-containing compound of ammonium nitrate is present in an amount of about 15.27 weight percent; and said second hydrogen-containing compound of $(NH_4)_2B_{10}H_{10}$ in present in an amount of about 14.73 weight percent.

4. The composition of claim 1 wherein said primary heat and hydrogen source selected consists of a ammonia borane in an amount of about 50.00 weight percent and hydrazine bisborane in an amount of about 30.00 weight percent; said first hydrogen-containing compound of ammonium nitrate is present in an amount of 10.20 weight percent; and said $(NH_4)_2B_{10}H_{10}$ is present in an amount of about 9.80 weight percent.

5. The composition of claim 1 wherein said primary heat and hydrogen source selected is ammonia borane in an amount of about 69.37, said first hydrogen-containing compound of ammonium nitrate is present in an amount of about 15.59 weight percent; and said second hydrogen-containing compound of $(NH_4)_2B_{10}H_{10}$ is present in an amount of about 15.04 weight percent.

* * * * *